United States Patent [19]

Silvestrini

[11] Patent Number: 5,033,372
[45] Date of Patent: Jul. 23, 1991

[54] APPARATUS FOR PEELING FRUITS AND VEGETABLES

[75] Inventor: Jesus A. Silvestrini, Mendoza, Argentina

[73] Assignee: IMDEC, S.A., Mendoza, Argentina

[21] Appl. No.: 619,176

[22] Filed: Nov. 27, 1990

[51] Int. Cl.[5] .......................... A23N 7/00; A23N 7/02
[52] U.S. Cl. ..................................... 99/625; 15/3.19; 99/584; 99/587; 99/623; 99/628
[58] Field of Search ................. 99/584, 587, 585, 586, 99/574, 575, 623, 624, 625–628, 629; 426/482, 483; 15/3.19, 3.2; 51/357

[56] References Cited

U.S. PATENT DOCUMENTS

| | | |
|---|---|---|
| 719,617 | 2/1903 | Scovill . |
| 1,194,318 | 11/1916 | Power ................................. 99/628 |
| 1,226,418 | 5/1917 | Trust ................................... 99/587 |
| 1,581,071 | 4/1926 | Lowe . |
| 2,034,951 | 3/1936 | McArdle et al. ..................... 99/628 |
| 2,161,237 | 6/1939 | Skliris .................................. 99/628 |
| 2,619,139 | 11/1952 | Riggle et al. ......................... 99/628 |
| 2,627,140 | 2/1953 | Marzolf ................................ 15/3.2 |
| 3,618,651 | 11/1971 | Hart et al. . |
| 3,811,000 | 5/1974 | Lazzarini ............................ 426/483 |
| 3,854,395 | 12/1974 | Hirahara .............................. 99/625 |
| 4,355,572 | 10/1982 | Silvestrini ............................ 99/587 |
| 4,444,096 | 4/1984 | Silvestrini et al. ................... 99/585 |
| 4,450,760 | 5/1984 | Wilson ................................. 99/623 |
| 4,509,414 | 4/1985 | Chiu et al. ........................... 99/585 |
| 4,611,532 | 9/1986 | Trinkley .............................. 99/628 |
| 4,621,573 | 11/1986 | Lange .................................. 15/3.2 |
| 4,770,887 | 9/1988 | Tarry et al. ........................ 426/482 |

FOREIGN PATENT DOCUMENTS 0011659  6/1980  European Pat. Off. .............. 99/628

Primary Examiner—Timothy F. Simone
Attorney, Agent, or Firm—Pettis & McDonald

[57] ABSTRACT

Apparatus for peeling fruits and vegetables includes a plurality of substantially parallel shafts including a first set of shafts and a second set of shafts with one of the second set shafts interposed between each adjacent pair of the first set of shafts, a plurality of axially adjacent and spaced peeling disks affixed to each shaft for rotation therewith with each such disk having a flexible radially extending portion for engaging an item to be peeled with means for rotating all of the shafts in the same direction with all of the shafts of the first set being rotated at a first predetermined speed and all of the shafts of the second set being rotated at a second speed differing from the first speed with support apparatus for supporting the rotating mechanism and the shafts.

7 Claims, 3 Drawing Sheets

5,033,372

APPARATUS FOR PEELING FRUITS AND VEGETABLES

BACKGROUND OF THE INVENTION

This invention relates generally to apparatus for peeling fruits and vegetables. More particularly, it relates to apparatus for removing the skin from such fruits and vegetables on which the skin has already been loosened by immersion in a hot liquid solution. In a typical process of this nature the fruit, which may typically include apricots, nectarines, plums, apples, pears, tomatoes, potatoes or other types, is initially immersed in a hot caustic solution, which causes the peel to be loosened from the flesh of the fruit but not removed from it. The treated fruit conventionally is then carried past a number of strong jets of water that flush the loosened peel from the fruit. While this procedure is effective, it produces large volumes of waste liquid containing the water from the jets, the pieces of peel and traces of the caustic solution. This waste liquid presents disposal and pollution problems that are becoming unacceptable for commercial operations.

SUMMARY OF THE INVENTION

In order to overcome the problems of the conventional peeling technology, it is an object of this invention to provide apparatus for substantially dry removal of the loosened peel, without the use of water jets. To achieve these objects, apparatus is provided that includes a plurality of shafts having substantially parallel axes comprising a first set of shafts and a second set of shafts, with one of the second set of shafts interposed between each adjacent pair of the first set of shafts, a plurality of axially adjacent and spaced peeling disks affixed to each shaft for rotation therewith, each such disk having a flexible radially extending portion for engaging an item to be peeled, with the disks on each shaft being axially staggered with respect to the disks on each adjacent such shaft and the shafts being positioned to provide for interleaving of the disks on adjacent such shafts. Means are also provided for rotating all of the shafts in the same direction, with all of the shafts of the first set being rotated at a first predetermined speed, and all of the shafts of the second set being rotated at a second speed differing from that first speed. Suitable support structure is provided for supporting the rotating means and the shafts. In another aspect of the invention a peeling disk for use in such apparatus includes a disk of polymer material of predetermined thickness that is sufficiently flexible to deflect upon engagement with an item to be peeled to present the radially extending side of the disk to that item, such disk including a plurality of thickened rib portions extending in a direction generally radially outwardly of the shaft carrying the disk to a point proximal the outer periphery of that disk. In a particularly preferred embodiment the disk also includes a thickened annular rim portion extending about the disk outer periphery.

BRIEF DESCRIPTION OF THE DRAWINGS

A particularly preferred embodiment of the peeling apparatus of this invention is illustrated in the drawings in which.

DESCRIPTION OF PREFERRED EMBODIMENTS

Figure 1:
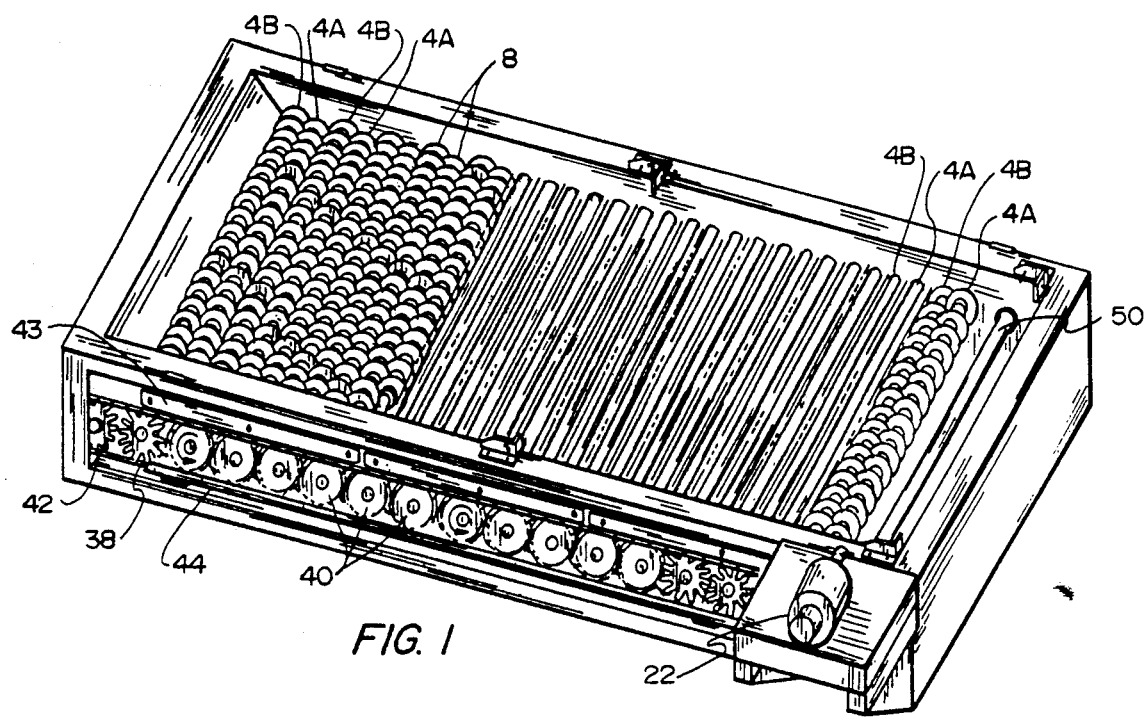
FIG. 1 is a an upper perspective view of the apparatus of this invention.

A particularly preferred embodiment of the peeling apparatus of the present invention is illustrated in FIGS. 1-6 of the drawings. This apparatus comprises, generally, support means, suitably in the form of a frame or chassis 2 to which are rotatably mounted a plurality of shafts 4 having substantially parallel axes and comprising a first set 4a of such shafts and a second set 4b of such shafts, with one of the second set shafts 4b interposed between each adjacent pair of such first set shafts 4a. The supporting frame may be formed in any convenient and conventional manner, such as by welded sheet metal or the like, with the shafts 4a and 4b being fabricated of a suitable material such as steel alloy and supported on such frame 2 by conventional bearings 6, which preferably may be sealed ball bearings affixed to the support frame 2.

The support frame 2 preferably is in the form of a perimeter frame with open top and bottom to permit the peel from fruit being processed to fall through the frame to a convenient receptacle placed below. If desired, a removable cover may be provided over a portion of the upper part of the frame 2, and a side cover 7 (FIG. 2) may be provided, as well.

Figure 5:
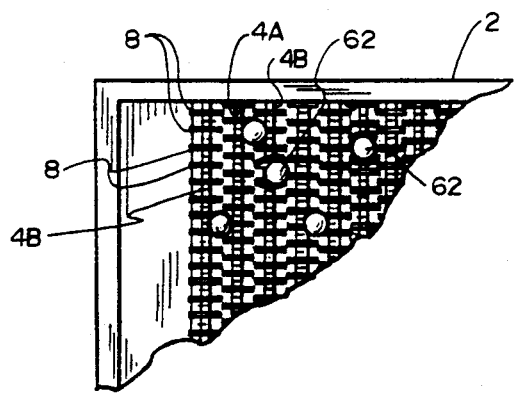
FIG. 5 is a sectional elevation of the apparatus of FIG. 3 taken along lines 5—5.
Figure 7:
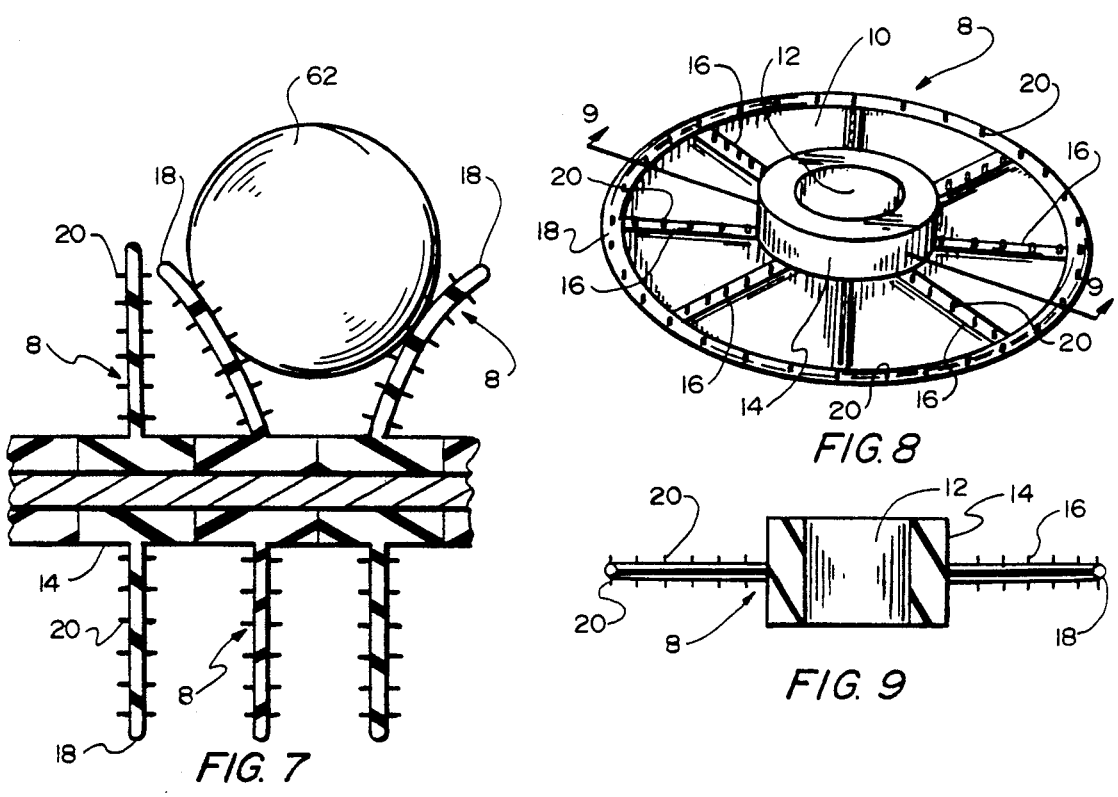
FIG. 7 is a fragmentary sectional view at a larger scale of the peeling disks on a shaft as in FIG. 5.
Figure 8:
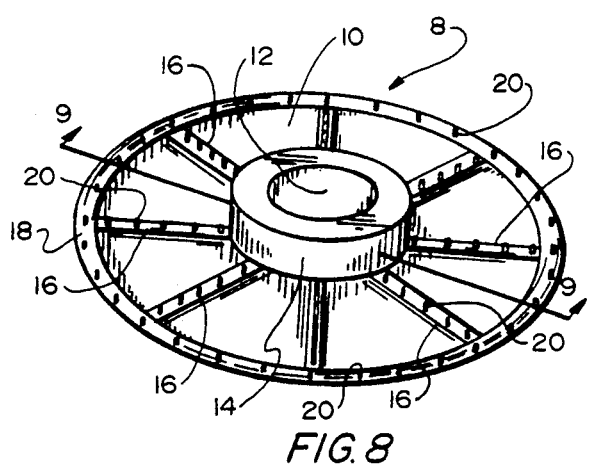
FIG. 8 is a perspective view of one of the peeling disks of FIG. 7.
Figure 9:
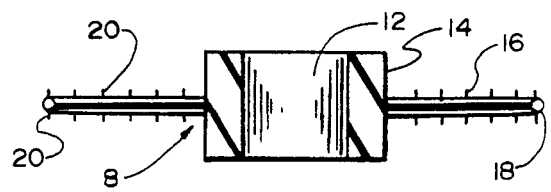
FIG. 9 is a sectional view of the peeling disks of FIG. 8, taken along line 9—9.

Supported on each of the shafts 4a and 4b are a plurality of axially adjacent and spaced peeling disks 8, which preferably are of the configuration illustrated in FIGS. 7-9. Each of these disks 8, which may suitably be formed of a flexible synthetic polymer material, has a flexible, radially extending portion 10 for engaging an item to be peeled, generally in the manner illustrated in FIG. 7. As shown in FIGS. 1 and 5, the disks on each shaft 4 are axially staggered with respect to the disks on each adjacent such shaft. Thus, the disks on each shaft 4a are axially staggered with respect to the disks on adjacent shaft 4b, and those shafts are positioned to provide for interleaving of the disks on adjacent such shafts 4a and 4b, as shown most clearly in FIG. 5. Each of these disks is affixed in a conventional manner to its respective shaft such that rotation of the shaft will effect the same rotation of each of the disks thereon.

Figure 6:
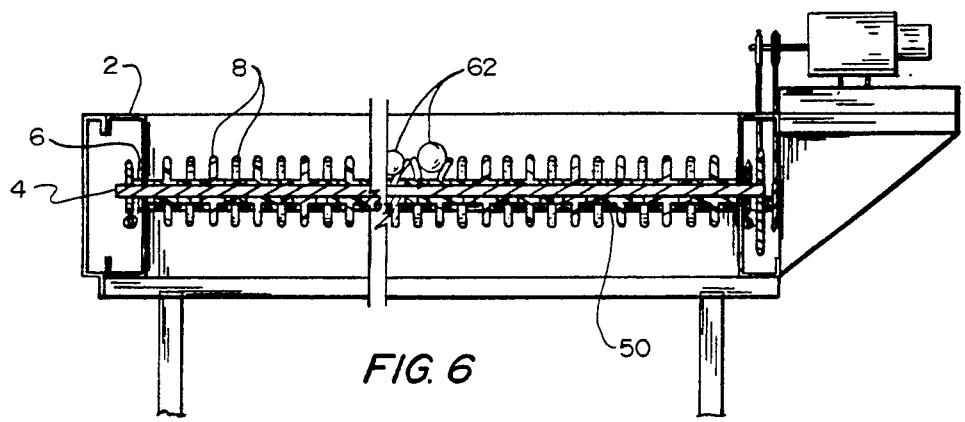
FIG. 6 is a fragmentary top plan view of the apparatus of FIG. 1.

As shown most clearly in FIGS. 7-9, each of the peeling disks 8 comprises a disk 10 of a conventional polymeric material such as a synthetic rubber or the like, having a predetermined thickness and sufficient flexibility to deflect upon engagement with an item to be peeled, as shown in FIG. 7. This disk 10 has a central aperture 12 surrounded by a thickened hub portion 14 to support the disk on its respective shaft 4a or 4b. The thickness of this hub portion 14 is also selected to provide for appropriate spacing between adjacent such disks 8 when the disks are stacked on a shaft, as shown in FIGS. 6 and 7.

In the preferred embodiment illustrated, each peeling disk also includes a plurality of generally radially extending thickened rib portions 16 that extend outwardly from the shaft or hub portion to a point proximal the outer periphery of the disk. Preferably, the peeling disks 8 also include a thickened annular rim portion 18 extending about the outer periphery of the disk. As shown most clearly in FIG. 8, the radially outermost portion of each of the rib portions 16 preferably intersects the thickened rim portion 18. To further enhance the peeling function of this apparatus, each of the peeling disks 8 of this embodiment suitably also includes a plurality of projections 20 extending generally axially outwardly of at least one of the rib portions 16, and suitably from each of the rib portions as well as the thickened rim portion, whereby those projections provide additional roughness to the surface of the disk to assist in the peeling action thereof.

Figure 2:
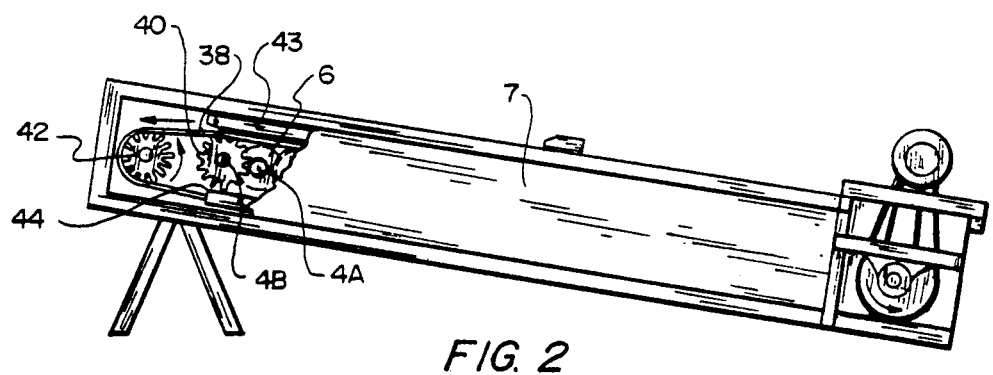
FIG. 2 is a side elevation of the apparatus of FIG. 1.
Figure 3:
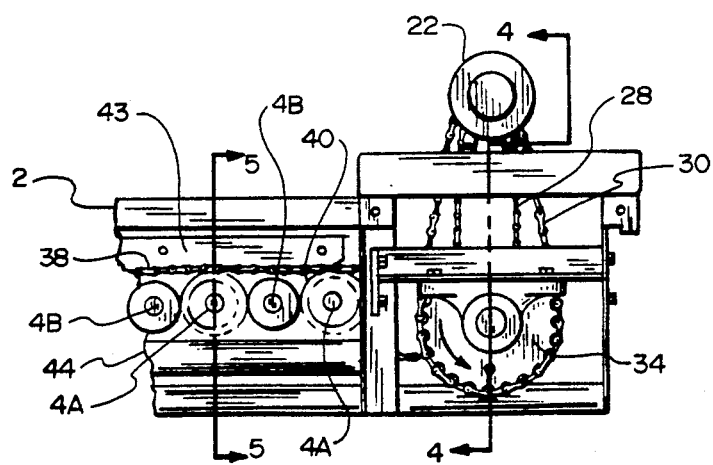
FIG. 3 is a fragmentary side elevation on a larger scale of the right end of the apparatus of FIG. 2.
Figure 4:
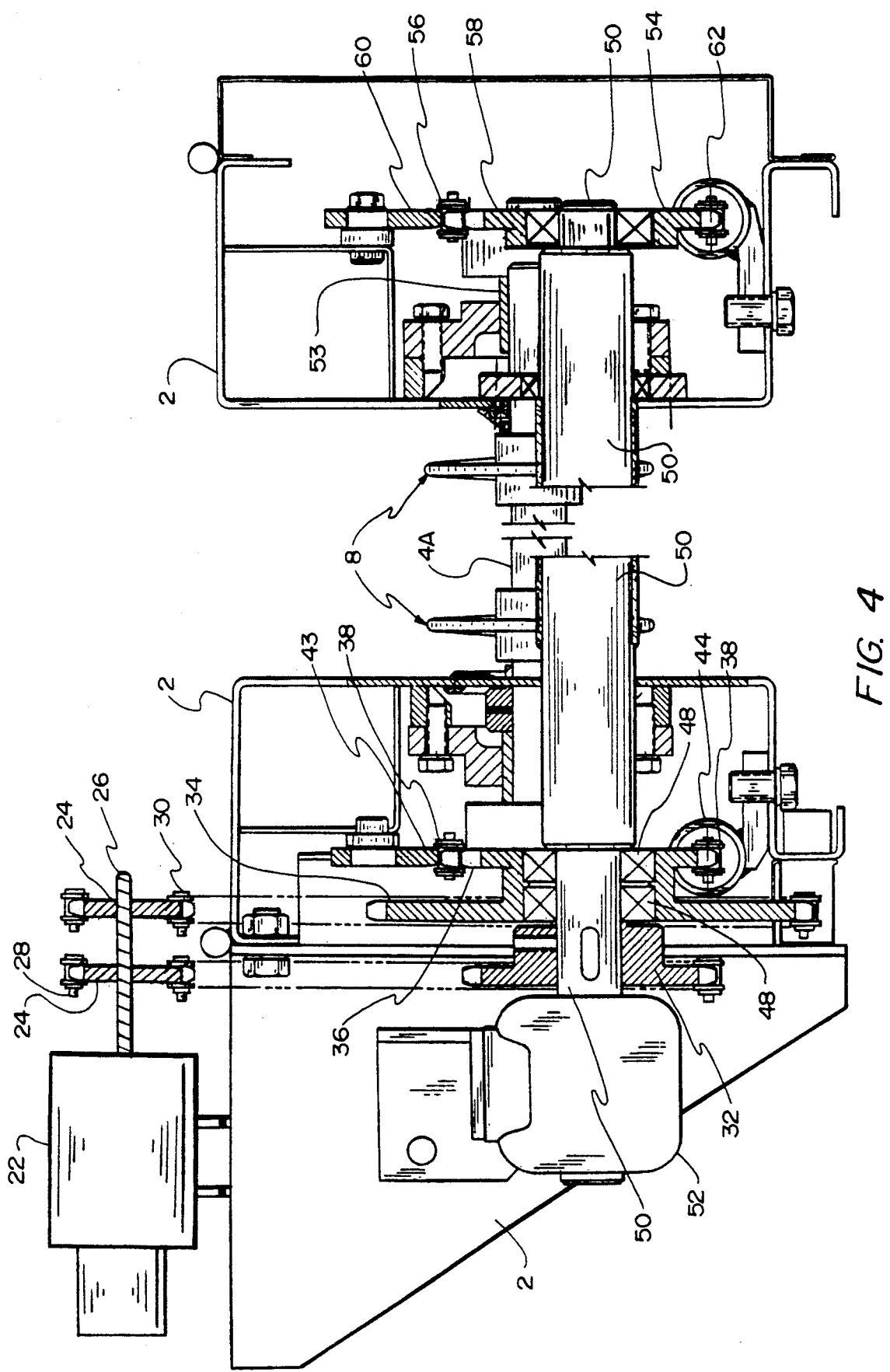
FIG. 4 is a sectional view taken along lines 4—4 of FIG. 3.

On FIGS. 3 and 4 are shown most clearly the means for rotating all of the shafts 4a and 4b in the form of a prime mover 22, which suitably is a conventional combined electric motor and gear reducer, connected through a series of chains and sprockets to the shafts. As described in greater detail below, this arrangement provides for rotating all of the shafts in the same direction, suitably counterclockwise in the illustrations of FIGS. 1-3, with the first set of shafts 4a being rotated at a first predetermined speed and all of the second set of shafts 4b being rotated at a second speed differing from that first speed. The individual components making up this rotating means may each be relatively conventional, comprising in this preferred embodiment a pair of chain sprockets 24, which may suitably be substantially identical mounted to the shaft 26 of the motor/gear reducer 22. A pair of drive chains 28 and 30 run between these motor shaft sprockets 24 and peeling drive shaft sprockets 32 and 34, which preferably are of different diameters, whereby the drive chains will drive the sprockets 32 and 34 at different rotational speeds.

Sprocket 34, driven by chain 30, preferably also includes either as an integral portion or attached to that sprocket 34 a second, axially spaced sprocket 36 that is driven by the rotation of sprocket 34. Extending around this sprocket 36 is peeling roller drive chain 38, shown most clearly in FIGS. 2 and 3, which also drivingly engages a plurality of sprockets 40, each of which is affixed to one end of one of the respective peeling roller shafts 4b. An idler sprocket 42 is provided at the end of the peeling apparatus 2 opposite the drive motor 22. A chain guide 43, which may formed of a suitable low friction, rigid, synthetic resin and placed directly above the chain 38 to prevent that chain from jumping out of contact with its sprockets 40 as it passes in engagement with the upper portions of those sprockets. This chain guide 43 may conveniently be fabricated of a plurality of sections, as shown in FIG. 1. While not necessary, there is also provided a chain return tube 44 attached in a conventional manner to the support chassis 2, to protect and guide the chain 38 in its return path to the sprocket 36.

By use of the foregoing drive structure, each of the set of shafts 4b may be rotatably driven at a speed proportional to the speed of the motor 22 and at a ratio thereof determined by the relative diameters of the sprockets 34, 36 and 40.

As shown most clearly in the illustration of FIG. 4, sprockets 34 and 36 are rotatably supported by suitable bearings 48 on shaft 50 that is supported by conventional bearings 52 and 53 proximal each end thereof that are mounted to the support chassis 2. Thus, the sprockets 34 and 36 may rotate at a speed independent of the rotational speed of that shaft 50. Affixed to the end of the shaft 50 proximal the drive motor 22 is the sprocket 32 to provide for rotational drive of that shaft 50. Affixed proximal the end of shaft 50 opposite the end carrying sprocket 32 is another sprocket 54 which may suitably be substantially identical in outer diameter to that of sprocket 36, and which drives a second drive chain 56 in substantially the same manner as chain 38 is driven. This drive chain 56 engages a plurality of sprockets 58, in a manner similar to the driving engagement between chain 38 and sprockets 40, each of which sprockets 56 is affixed to the end of one of the respective shafts 4b to rotate each of those shafts 4b in the same direction as the rotation of shafts 4a but at a speed different (in this case faster) than the rotation of those shafts 4a.

An upper chain guide 43, suitably in the form of a metal or synthetic resin plate, may be positioned directly above the upper portion of drive chain 38, as shown in FIGS. 1-4, to prevent the drive chain from jumping out of engagement with the sprockets 40. A similar upper chain guide 60 may be provided above the upper portion of chain 56 on the opposite side of the apparatus, for the same purpose. On that same side a tubular lower chain guide 62 may also be provided, substantially the same as the lower chain guide 44 described above.

As shown most clearly in FIGS. 5-7, the positioning of axially adjacent peeling disks 8 is such that the fruit or vegetable to be peeled has a considerably larger transverse dimension than the distance between adjacent disks 8. Thus, as shown in FIG. 7, the fruit or vegetable object to be peeled deflects axially outwardly the peripheries 18 of adjacent peeling disks 8. The rotation of these adjacent peeling disks 8, and particularly the engagement of the radially extending ribs 16 and the thickened periphery 18 with their projections 20 serve to abrade and pull away the loosened skin of that fruit or vegetable while it is between those disks.

As shown most clearly in FIG. 2, the entire unit is mounted at an angle with the fruit being introduced into the peeling apparatus at the upper (left in FIGS. 1, 2 and 5) end of the apparatus and slowly tumbling down the inclined bed of the peeling disks to the discharge gap at the right end of FIGS. 1, 2 and 5. The differing rotational speeds of the alternating shafts 4a and 4b, which preferably rotate in a counterclockwise direction when viewed as in FIGS. 1-3, and thus of the peeling disks 8 mounted thereupon, serves to alternately accelerate and decelerate the motion of the fruit as it tumbles down the inclined machine, thus increasing the frictional engagement and peeling action of the disks. The fruit peel that is removed during this process falls between the spaced shafts 4a and 4b, which are positioned sufficiently closely to prevent the fruit or vegetable items from falling through. These portions of the peel are then collected in a suitable receptacle for subsequent disposal or use as desired. The peeled fruit then are discharged from the apparatus by falling through the space adjacent shaft 50 (FIG. 1) into a suitable collecting receptacle.

While the foregoing describes a particularly preferred embodiment of the apparatus of this invention, it is to be recognized that numerous variations and modifications of the apparatus of this invention will readily occur to those skilled in the art. Accordingly, the foregoing description is to be considered illustrative only of the principles of the invention and is not to be considered limitative thereof. The scope of the invention is to be defined solely by the claimed appended hereto.

What is claimed is:

1. Apparatus for peeling fruits and vegetables, comprising, in combination
   a plurality of shafts having substantially parallel axes and comprising a first set of said shafts and a second set of said shafts, with one of said second set shafts interposed between each adjacent pair of said first set shafts,
   a plurality of axially adjacent and spaced peeling discs affixed to each shaft for rotation therewith, each said disc having a flexible radially extending portion for engaging an item to be peeled, said discs on each said shaft being axially staggered with respect to said discs on each adjacent said shaft, and said shafts being positioned to provide for interleaving of said discs on adjacent said shafts:
   means for rotating all said shafts in the same direction with all said shafts of said first set being rotated at a first predetermined speed and all said shafts of said second set being rotated at a second speed differing from said first speed; and
   support means for supporting said rotating means and said shafts.

2. The apparatus of claim 1 wherein said peeling discs each comprise a disc of a polymer material of a predetermined thickness and sufficient flexibility to deflect upon engagement with said item to be peeled to present said radially extending portion of said disc to said item, said discs further including a plurality of thickened rib portions extending in a direction generally radially outwardly of said shaft carrying said disc to a point proximal the outer periphery of said disc.

3. The apparatus of claim 2 wherein said peeling discs further include a plurality of projections extending generally axially outwardly of at least one of said rib portions, whereby the rib portion projections provide additional roughness to the surface of the discs to assist in the peeling action thereof.

4. A peeling disc for use in fruit and vegetable peeling apparatus having a plurality of rotating shafts with each shaft carrying a bank of spaced discs, said peeling discs comprising
   a disc of a polymer material of a predetermined thickness and sufficiently flexible to deflect upon engagement with an item to be peeled to present the radially extending side of said disc to that item, said disc including a plurality of thickened rib portions extending in a direction generally radially outwardly of said shaft carrying said disc to a point proximal the outer periphery of said disc.

5. The peeling disc of claim 4 further comprising a thickened annular rim portion extending about said disc outer periphery.

6. The peeling disc of claim 5 wherein the radially outermost portion of each of said rib portions intersects said thickened rim portion.

7. The peeling disc of claim 4 further comprising a plurality of projections extending generally axially outwardly of at least one of said rib portions, whereby the rib portion projections provide additional roughness to the surface of the disc to assist in the peeling action thereof.

* * * * *